(12) United States Patent
Wood

(10) Patent No.: US 10,150,400 B2
(45) Date of Patent: Dec. 11, 2018

(54) VEHICLE FOR RECEIVING AND DELIVERING AGRICULTURAL SEEDS AND OTHER GRANULAR MATERIAL

(71) Applicant: J. & M. Manufacturing Co., Inc., Fort Recovery, OH (US)

(72) Inventor: James E. Wood, Fort Recovery, OH (US)

(73) Assignee: J. & M. Manufacturing Co., Inc., Fort Recovery, OH (US)

(*) Notice: Subject to any disclaimer, the term of this patent is extended or adjusted under 35 U.S.C. 154(b) by 1 day.

(21) Appl. No.: 15/454,061

(22) Filed: Mar. 9, 2017

(65) Prior Publication Data

US 2018/0257536 A1 Sep. 13, 2018

(51) Int. Cl.
*B60P 1/36* (2006.01)

(52) U.S. Cl.
CPC ....................................... *B60P 1/36* (2013.01)

(58) Field of Classification Search
CPC ........................................................ B60P 1/36
See application file for complete search history.

(56) References Cited

U.S. PATENT DOCUMENTS

| | | |
|---|---|---|
| 3,498,483 A | 3/1970 | Meharry |
| 5,718,556 A | 2/1998 | Forsyth |
| 5,888,044 A | 3/1999 | Baskerville |
| 7,267,519 B2 | 9/2007 | Cresswell et al. |
| 7,488,149 B2 | 2/2009 | Waldner |
| 8,221,047 B2 | 7/2012 | Petersen et al. |
| 8,931,995 B2 | 1/2015 | Fitzgerald et al. |
| 8,967,940 B2 | 3/2015 | Petersen et al. |
| 9,096,376 B1 | 8/2015 | Wood et al. |
| 9,333,892 B2 * | 5/2016 | Johnson ................. B60P 1/36 |
| 9,392,742 B2 | 7/2016 | Boston |
| 9,539,927 B2 | 1/2017 | Fitzgerald et al. |

* cited by examiner

*Primary Examiner* — Saul Rodriguez
*Assistant Examiner* — Ashley K Romano
(74) *Attorney, Agent, or Firm* — Jacox, Meckstroth & Jenkins

(57) ABSTRACT

A vehicle for receiving and delivering granular material, such as agricultural seeds, includes a frame supporting a container defining an open top chamber having a bottom outlet. An elongated conveyor is supported by a system which includes a first support arm having one end pivotally connected to a side wall of the container for multiple directional movement and a second support arm pivotably connected to the opposite end of the first support arm. The opposite end of the second support arm supports an intermediate portion of the conveyor near its center of gravity and in suspended relation for tilting and rotating the conveyor. Power actuators are connected to rotate and pivot the first support arm to position the conveyor in many selected positions including the conveyor inlet under the outlet of the chamber, a storage position and a position between horizontal and substantially inclined for filling other containers.

3 Claims, 6 Drawing Sheets

VEHICLE FOR RECEIVING AND DELIVERING AGRICULTURAL SEEDS AND OTHER GRANULAR MATERIAL

BACKGROUND OF THE INVENTION

This invention relates to a vehicle for receiving and delivering seeds. In general, these vehicles are commonly referred to as Seed Tenders and include a container having one or more open top bins or chambers for receiving a type of seed or different types of seed and for delivering the seed to an agricultural seed planter that is usually pulled by a tractor for depositing the seeds in parallel rows formed within the ground. Commonly, the vehicle carries an elongated conveyor which can be positioned for receiving the seeds within each bin or chamber through a bottom outlet and for elevating and delivering the seeds to seed receiving compartments within the seed planter. The conveyor may also be positioned for receiving a supply of seeds at the ground level and conveying the seeds above the open top chambers of the vehicle for filling seeds into each chamber. Preferably, the elevator is stored and carried by the vehicle for conveniently using the conveyor to add seeds to the open top chambers of the vehicle and to deliver seeds from the vehicle to the seed planter.

SUMMARY OF THE INVENTION

The present invention is directed to an improved vehicle for receiving and delivering agricultural seeds or granular material to a planter and which includes a new support system for an elongated conveyor that may be easily maneuvered into many various positions including a position for filling grains into each vehicle chamber, a position for delivering seed from the bottom outlet of each chamber of the vehicle to different compartments of a seed planter, a variable position outboard of the vehicle for use as a separate independent conveyor as well as a storage position carried by and within the boundaries of the vehicle.

The conveyor support system of the invention includes a first elongated support arm having one end portion pivotally connected to one of the side walls of the vehicle container for movement of the first support arm in first and second directions. A second elongated support arm has one end portion pivotally connected to an opposite end portion of the first support arm for movement relative to the first support arm, and the second support arm has an opposite end portion connected to an intermediate portion of the conveyor preferably at its center of gravity and with the conveyor in suspended relation. The first support arm and the second support arm provide for pivoting and tilting movement of the conveyor in vertical and horizontal directions. Preferably, the first support arm is power operated to move or tilt in a horizontal direction and is also power operated to tilt in a vertical direction.

Other features and advantages of the invention will be apparent from the following description, the accompanying drawings and the appended claims.

DESCRIPTION OF THE PREFERRED EMBODIMENT

Figure 1:
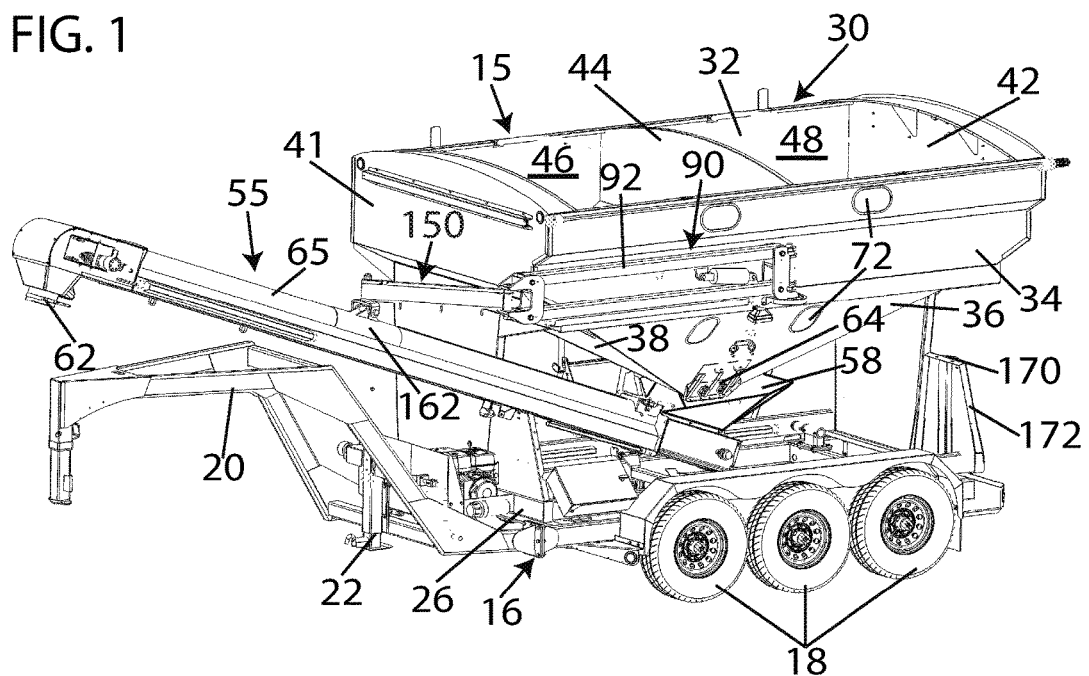
FIG. 1 is a perspective view of a seed receiving and delivering vehicle or seed tender constructed in accordance with the invention and showing an elongated seed conveyor positioned in a stored position by the conveyor support system of the invention.

Referring to FIG. 1, a mobile seed tender vehicle 15 includes a fabricated steel trailer 16 which may be supported by endless tracks or a set of wheels 18 on the left and right sides of the trailer, and includes a tongue 20 for connecting the trailer 16 to a tow vehicle (not shown). A jack 22 supports the forward end portion of the trailer 16 when disconnected from the tow vehicle. A fabricated steel seed support frame 26 is supported within the trailer 16 by a set of load cells extending between the frames for weighing the frame 26 with its supporting structure and seed, in a conventional manner.

A seed receiving container 30 is fabricated of sheet metal and includes upper side walls 32 and 34 and sloping or inclined bottom walls 36 and 38 which extend from the side walls and vertical end walls 41 and 42 to define an elongated open top chamber for receiving seed. As shown in FIG. 1, the elongated container 30 also has an intermediate wall 44 which is secured to the opposite side walls 32 and 34 and inclined side walls 36 to define a forward seed receiving chamber 46 and a rearward seed receiving chamber 48 in order for the container 30 to receive two different types of seeds. If additional types of seeds are desired to be received and delivered, additional intermediate walls 44 may be used to define additional seed receiving chambers.

The seed tender vehicle 15 also supports an elongated seed conveyor 55 which has a material receiving end portion or hopper 58 at one end and a seed discharge outlet 62 at the opposite end. Preferably, the elongated conveyor 55 is constructed as disclosed in U.S. Pat. No. 9,096,376 which issued to the assignee of the present invention and includes an elongated tubular conveyor housing 65 enclosing a conveying member, such as a power operated elongated endless flexible conveyor belt for conveying seed through the tubular housing. However, other forms of seed conveyors may also be used, such as, for example, a power operated endless belt conveyor within a rectangular housing and with longitudinally spaced slats for holding the seed in place on the conveyor belt.

As shown in FIGS. 1-4, each of the seed receiving chambers 46 and 48 has a bottom discharge outlet which may be selectively opened and closed by a sliding closure plate 64 so that seed from either chamber 46 or 48 may be discharged into the hopper 58 of the conveyor 55. The container 30 is also provided with inspection windows 72 which have transparent plastic closure sheets. The container 30 is also provided with a ladder 76 (FIG. 9) located adjacent the right side wall 32 of the container to provide for inspecting the seed within the chambers 46 or 48 from above the chambers.

Figure 8:
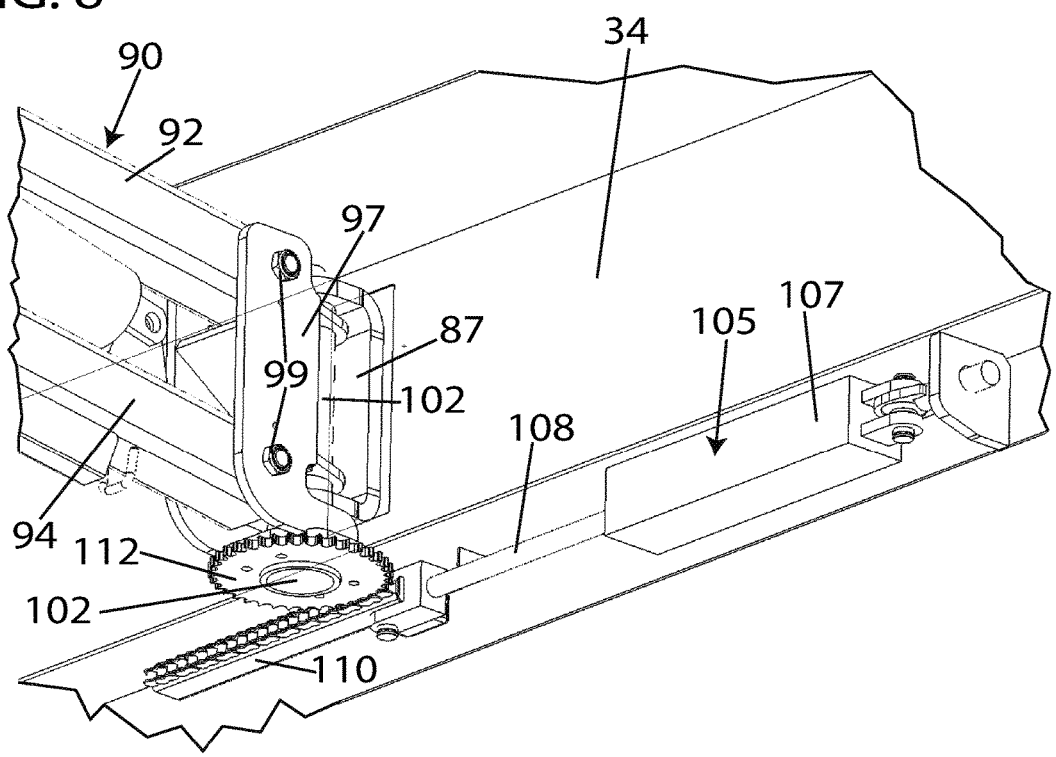
FIG. 8 is a fragmentary perspective view of the power actuator for rotating the first arm of the conveyor support system in a horizontal direction.

In accordance with the present invention, the conveyor 55 is supported by a conveyor support system 85 (FIG. 3) which includes a base support bracket 87 (FIG. 8) secured to the left vertical side wall 34 of the container 30 in alignment with the vertical wall 44 separating the seed chambers 46 and 48. The conveyor support system 85 includes a first elongated support arm 90 (FIGS. 3 & 10) formed by parallel spaced arm members 92 and 94 having inner end portions pivotally connected to a U-shaped end bracket 97 (FIGS. 8 & 10) by a set of pivot cross pins or bolts 99. The bracket 97 is secured to a vertical shaft 102 which is supported for rotation on a vertical axis by the flanges of the bracket 87. Thus the first support arm 90 is supported for movement in a first direction about the vertical shaft 102. In this embodiment, the first direction is horizontal movement about the vertical shaft 102. The parallel arm members 92 and 94 may move in second direction in a plane on the pivot bolts 99. In this embodiment, the parallel arm members 92 and 94 pivot in a vertical plane. As shown in FIG. 8, the shaft 102 and the first support arm 90 are rotated horizontally by a power actuator 105, including a hydraulic cylinder 107. The cylinder 107 has a piston rod 108 connected to an elongated rack 110 having teeth which engage teeth on a sprocket 112 secured to the bottom end portion of the shaft 102. Thus actuation of the cylinder 107, rotates the first support arm 90 horizontally on the vertical axis of the shaft 102.

Figure 10:
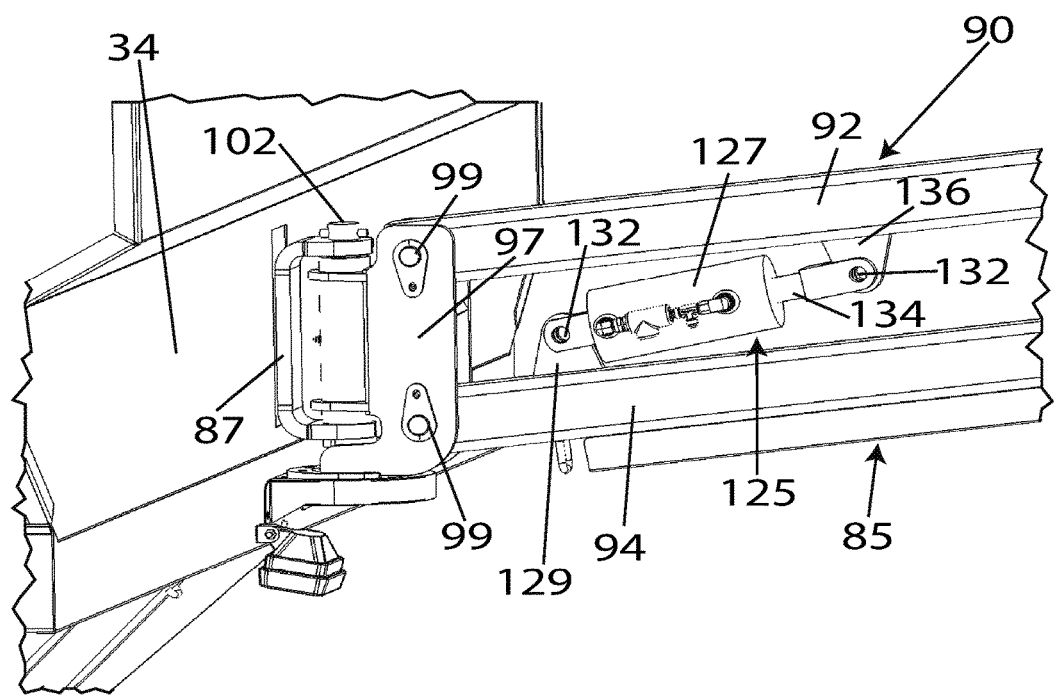
FIG. 10 is a fragmentary perspective view showing the power actuator for tilting the first arm of the conveyor support system in a vertical plane.
Figure 11:
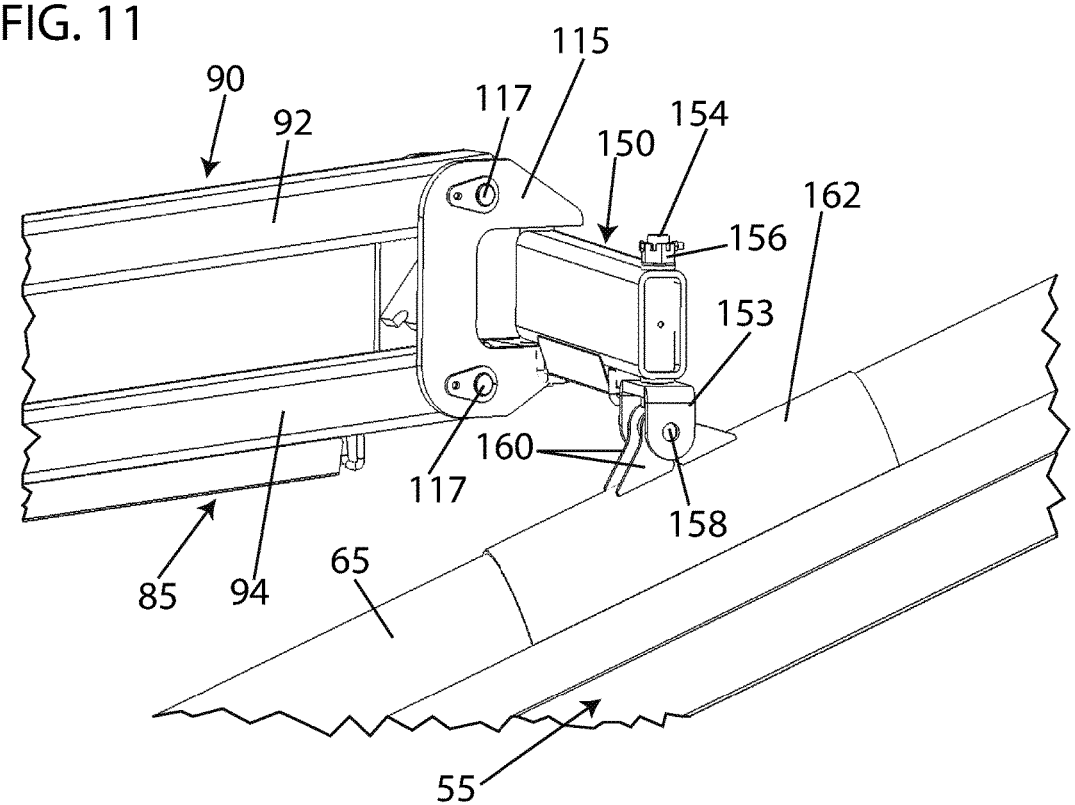
FIG. 11 is a fragmentary perspective view showing the suspended support of the conveyor from the second arm of the conveyor support system.

Referring to FIG. 11, the parallel arm members 92 and 94 of the first conveyor support arm 90 have outer end portions pivotally connected to a C-shaped end bracket 115 by a set of pivot pins or bolts 117 so that the arm members 92 and 94 remain parallel as they pivot on the bolts 99 and 117. Referring to FIG. 10, the first support arm 90 of the conveyor support system 85 is pivoted in a vertical plane by a power actuator 125 in the form of a hydraulic cylinder 127 extending from a flange or rib 129 secured to the lower arm member 94 and pivotally connected to the cylinder by a cross pin or bolt 132. The cylinder 127 has a piston rod 134 which is pivotally connected to a flange or rib 136 secured to the upper arm member 92 by a cross pivot pin or bolt 132. Thus extension and retraction of the piston rod 134 of the hydraulic cylinder 125 is effective to pivot the first support arm 90 upward and downward in a vertical plane and through a generally horizontal position shown in FIG. 7 to an upwardly projecting inclined position as shown in FIG. 9.

Referring to FIGS. 3-7 and 11, the conveyor support system 85 also includes a second elongated support arm 150 which has an inner end portion pivotally connected to the bracket 115 by a vertical pivot pin 152 (FIG. 9) so that the arm 150 is free to pivot or swing in a horizontal plane relative to the bracket 115. The arm 150 has an outer end portion which supports an inverted U-shaped bracket or clevis 153 for rotation on a vertical axis of a support pin 154 secured to the arm 150 by a nut 156. As also shown in FIG. 11, the inverted U-shaped bracket 153 is connected by a horizontal cross pin 158 to a pair of spaced flanges or ribs 160 secured to a curved plate 162 attached to the tubular housing 65 of the conveyor 55 at substantially the center of gravity of the conveyor 55. Thus the conveyor is suspended from the second support arm 150 and is free to pivot in a vertical plane on the horizontal axis of the pivot pin 158 and rotate horizontally on the axis of the pin 154.

Figure 2:
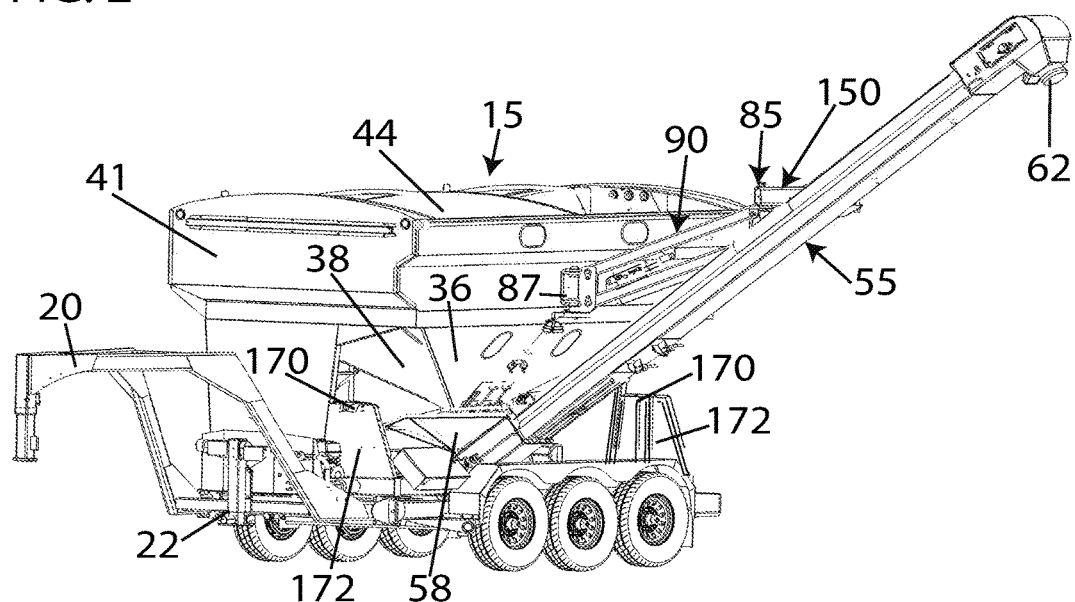
FIG. 2 is a perspective view of the vehicle shown in FIG. 1 with the conveyor supported by the support system for receiving grain from one of the vehicle chambers.
Figure 3:
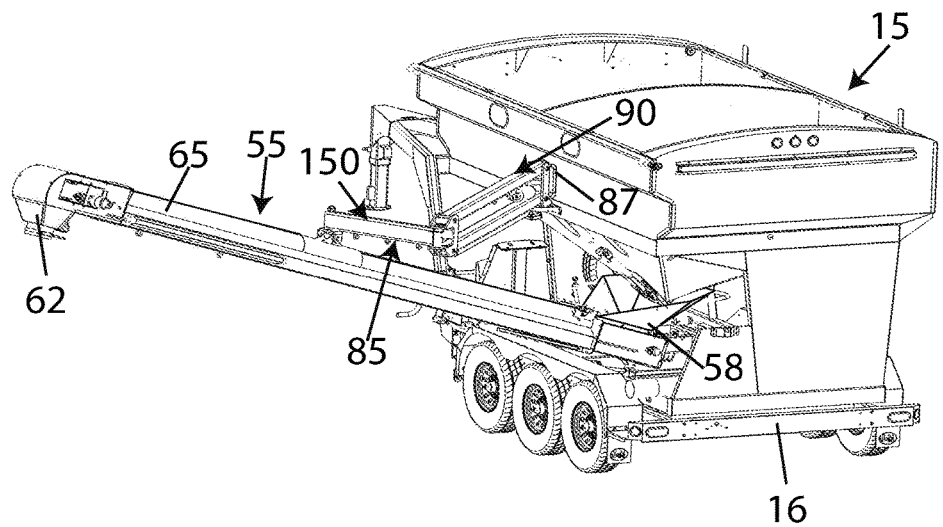
FIG. 3 is another perspective view showing the conveyor position for receiving seed from another chamber of the vehicle and with the conveyor positioned at a lower incline.
Figure 4:
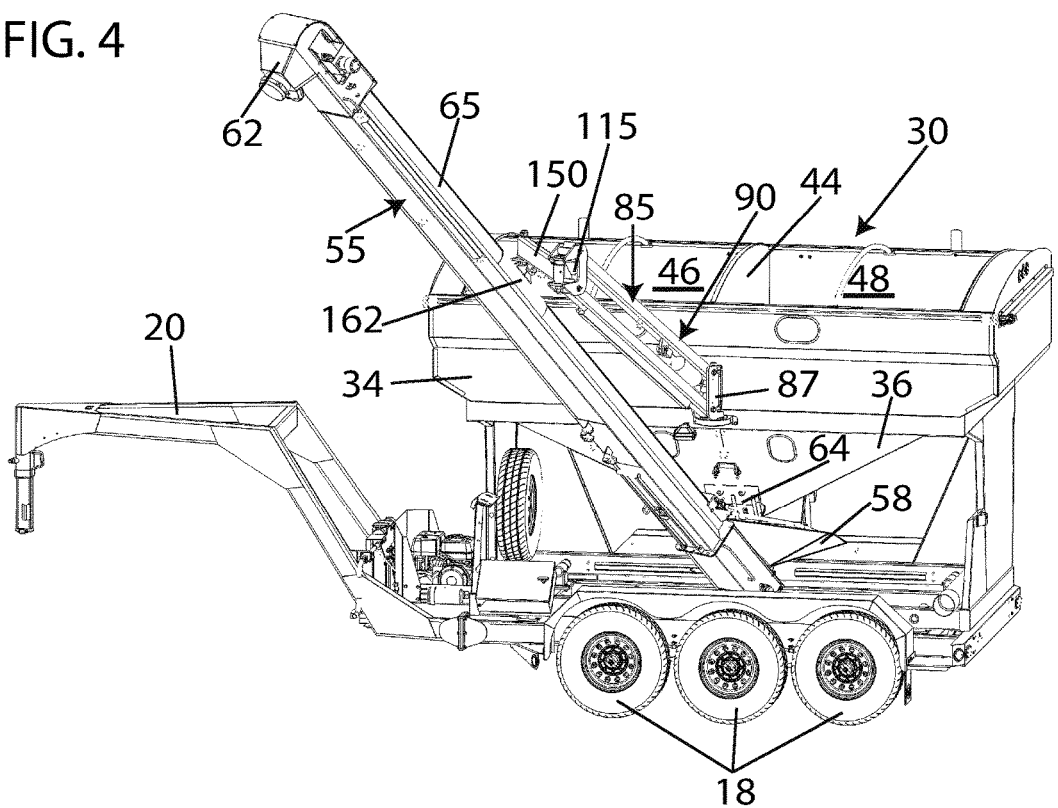
FIG. 4 is a perspective view similar to FIG. 3 with the conveyor shown at a steeper inclined position by the support system.
Figure 5:
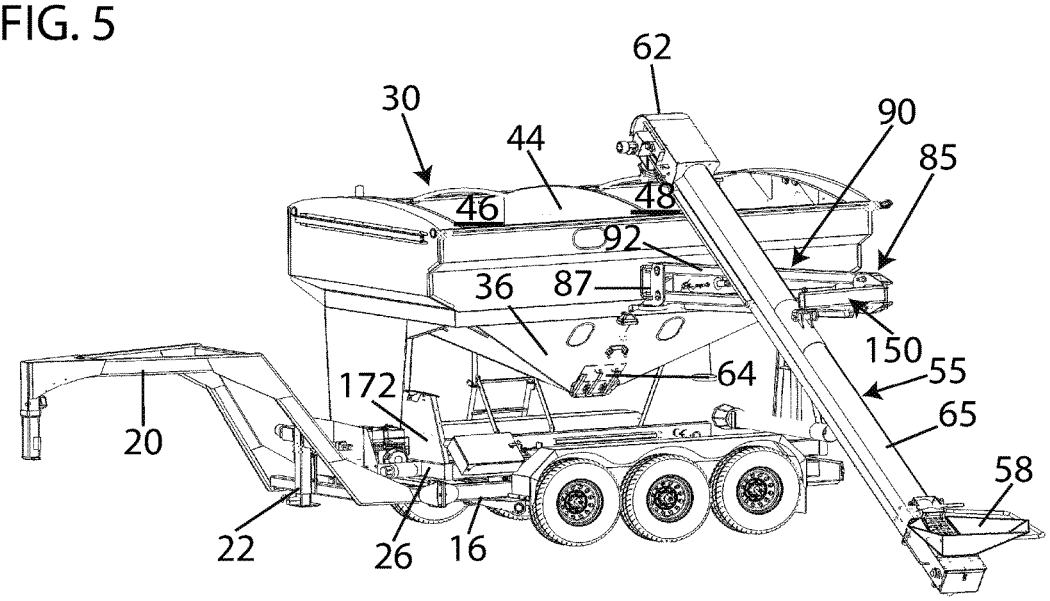
FIG. 5 is a perspective view of the vehicle with the conveyor positioned and supported by the support system for adding seed into a rear open top chamber of the vehicle.
Figure 6:
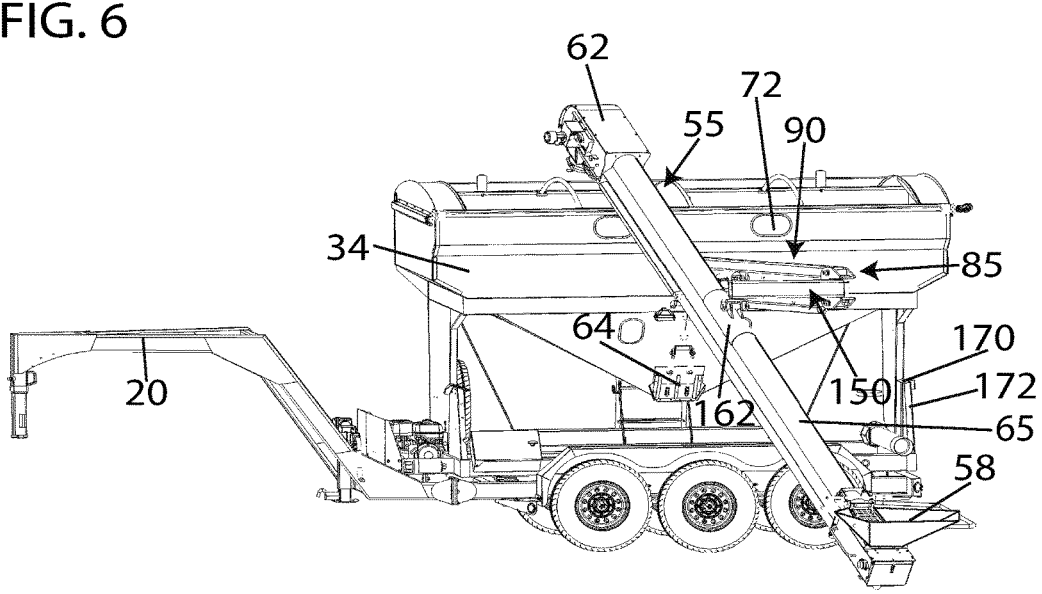
FIG. 6 is a perspective view similar to FIG. 5 and showing the conveyor supported and positioned for adding seed to the front open top seed chamber of the vehicle.
Figure 7:
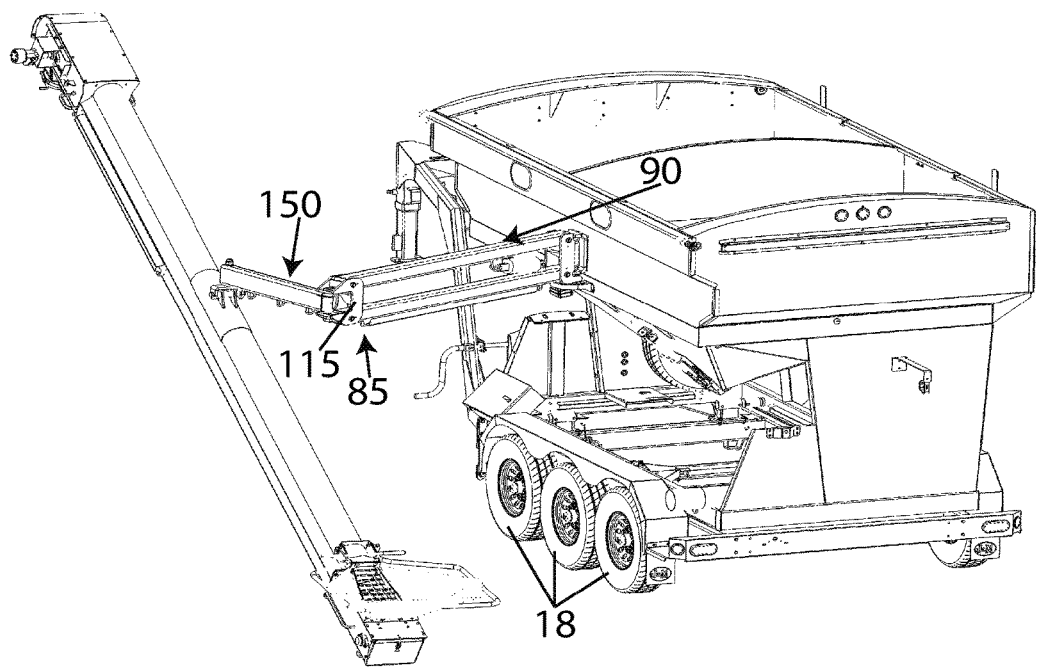
FIG. 7 is a perspective view of the vehicle with the conveyor supported outboard of and parallel to the vehicle by the support system for use of the conveyor at different inclinations for transporting seed from a supply to a container separate from the vehicle.
Figure 9:
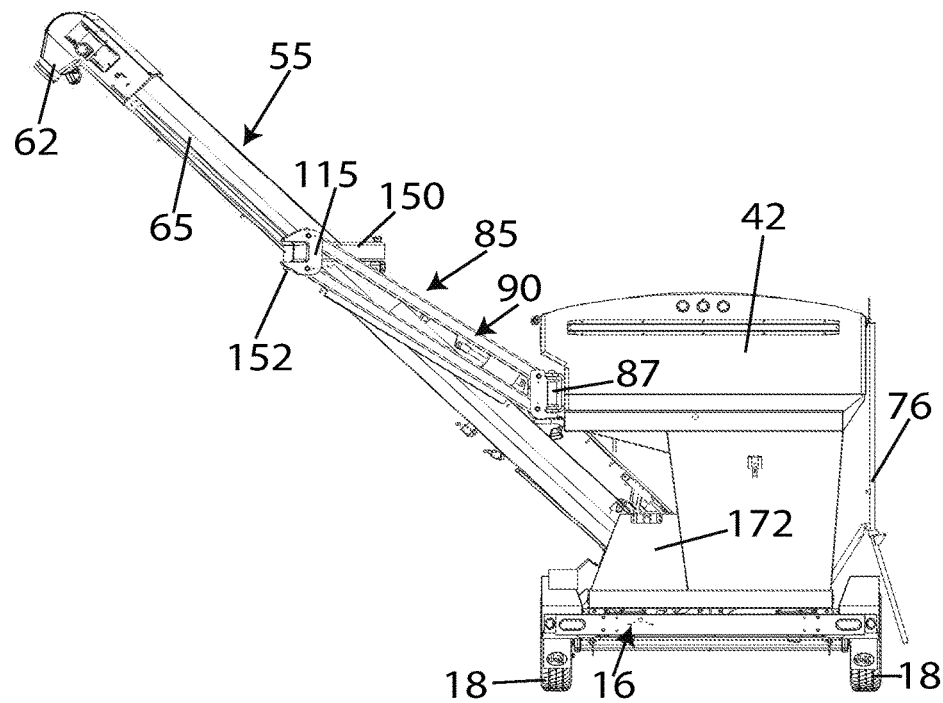
FIG. 9 is a rear view of the vehicle with the first arm of the conveyor support system in an upward inclined position.

As illustrated in FIGS. 1-7 and 9, the conveyor support system 85 of the invention provides for many selective positions of the conveyor 55 such as a storage position shown in FIG. 1 where the conveyor may rest on either support pad 170 supported by a frame 172 at each end of the seed support frame 26. The system 85 also supports the conveyor at a seed delivery position with the hopper 58 under the outlet of each of the seed chambers 46 and 48 for unloading each chamber, as shown in FIGS. 2-4, a seed filling or loading position for each of the chambers 46 and 48 and shown in FIGS. 5 & 6, and an outboard seed delivery and conveying system as shown in FIG. 7. In this position of FIG. 7, the conveyor 55 may be moved by the conveyor support system 85 from a substantially horizontal position adjacent the ground to a substantially inclined position even greater than the inclined position shown in FIG. 7. By pivoting the first support arm 90 to an upwardly inclined position, as shown in FIG. 9, the conveyor 55 may also be inclined to a position for the discharge outlet 62 is at an elevation substantially higher than the container 30 for conveying seed to a higher position, for example, into a storage bin or a container of a semi-trailer.

From the drawings in the above description, it is apparent that a seed tender vehicle constructed in accordance with the invention provides desirable features and advantages. For example, the conveyor support system 85 provides a wide selection for the position of the seed conveyor 55, for example from a substantially horizontal position outboard of the seed container 30 to a substantially inclined position where the discharge end 62 of the conveyor 55 is at an elevation substantially above the height of the seed receiving container 30. The construction of the conveyor support system 85, including the first support arm 90 and the second support arm 150 and the suspended and pivotal support of the conveyor 55 at substantially its center of gravity, provides these advantages and enable the seed conveyor 55 to be moved manually to many positions without using the power actuator 105 and/or 125. However, when it is desired to elevate the conveyor 55 to a substantially inclined position, as shown in FIGS. 2, 4 and 9, the power actuators 125 and 105 are used to position the conveyor at the desired position.

While the form of seed tender vehicle herein described constitutes a preferred embodiment of the invention, it is to be understood that the invention is not limited to this precise form of vehicle, and that changes may be made therein without departing from the scope of the invention as defined in the appended claims.

What is claimed is:

1. A vehicle for receiving and discharging granular material comprising:

a frame supporting a container having walls including opposite side walls defining an open top chamber for receiving the material, the container also having a bottom outlet with a closure for discharging the material, an elongated conveyor having a conveyor housing enclosing a moveable conveying member, the conveyor having a material receiving end portion at one end and a discharge outlet at the opposite end, a support system for the conveyor and including a base support member connected to an upper portion of one of the side walls of the container, a first support arm including an upper elongated arm member and a lower elongated arm member in parallel spaced relation, with each elongated arm member having opposite end portions pivotally connected to opposite end members for pivotal movement of each elongated arm member relative to each end member, one of the end members of the first support arm pivotally connected to the base support member and supporting the one end portion of the first support arm for vertical and horizontal movement, a substantially horizontal elongated second support arm having one end portion pivotally connected to an opposite end member of the first support arm for horizontal movement of the second support arm relative to the first support arm, the horizontal elongated second support arm having an opposite end portion coupled to and supporting an intermediate portion of the conveyor housing in suspended relation at substantially the center of gravity of the conveyor and providing for pivotal and rotational movement of the conveyor in vertical and horizontal directions relative to the second support arm, a power actuator connected to the upper arm member and the lower arm member of the first support arm and operable to move the first support arm, the second support arm and the conveyor in a vertical direction, and the support system including the first support arm and the horizontal second support arm providing for moving the conveyor between a storage position adjacent the container, an inclined unloading position with the material receiving end portion of the conveyor located under the outlet of the container, an inclined loading position with the discharge outlet of the conveyor located above the open top container, and an inclined position spaced laterally outwardly from the vehicle.

2. A vehicle as defined in claim 1 wherein the power actuator is located between the parallel elongated arm members of the first support arm and is pivotally connected to both of the arm members.

3. A vehicle as defined in claim 1 and including a power actuator adjacent the base support member and connected by a rack and sprocket to rotate the first support arm, the second support arm and the conveyor in a horizontal direction.

* * * * *